Dec. 27, 1955
A. W. BONHAM
2,728,353
MULTIWAY VALVE
Filed Nov. 29, 1951
2 Sheets-Sheet 1
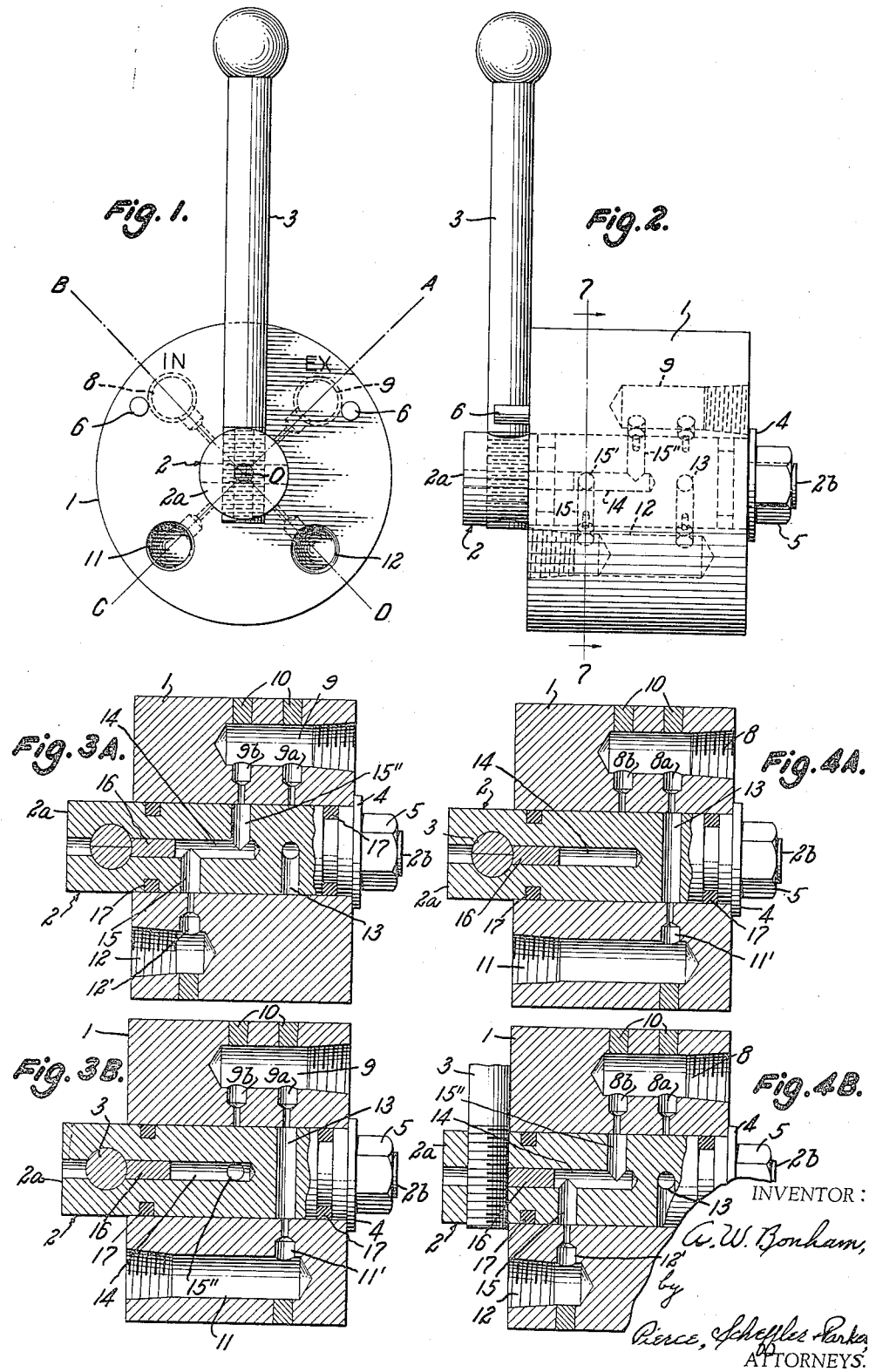
INVENTOR:
A. W. Bonham,
by
Pierce, Scheffler & Parker
ATTORNEYS.

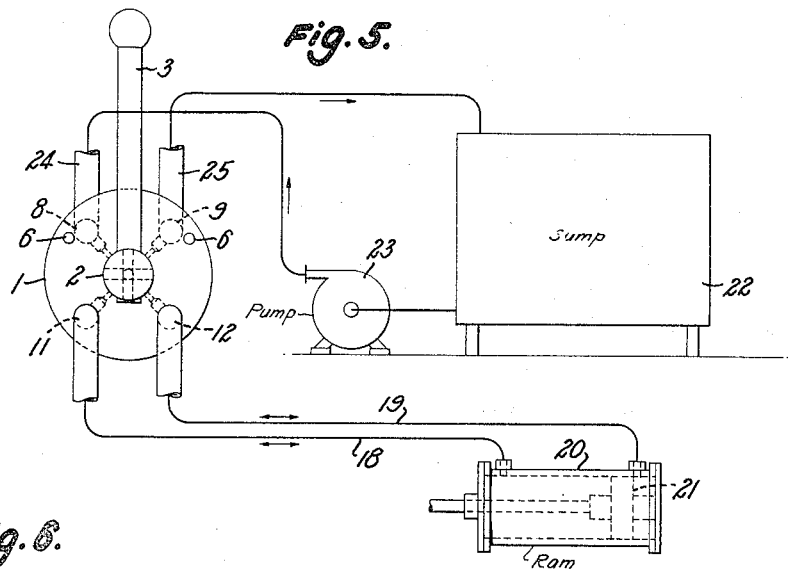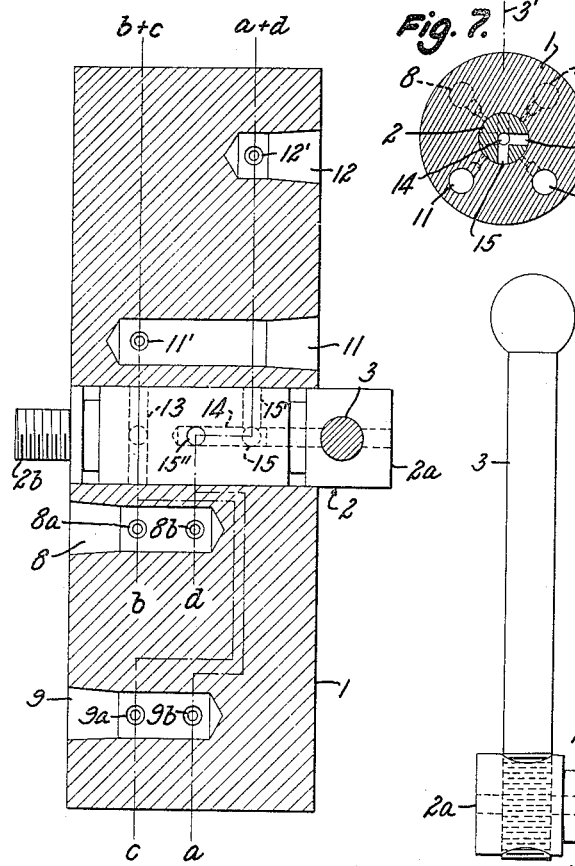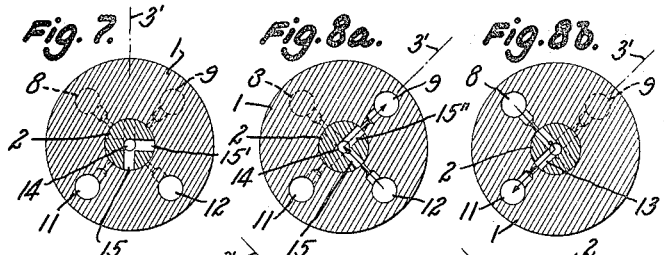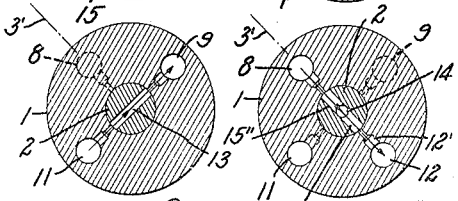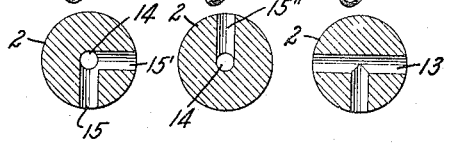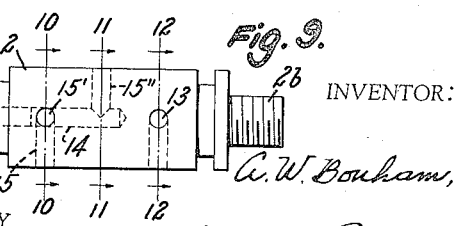

United States Patent Office 2,728,353
Patented Dec. 27, 1955

2,728,353

MULTIWAY VALVE

Albert W. Bonham, Murray, Utah

Application November 29, 1951, Serial No. 258,861

1 Claim. (Cl. 137—624)

This invention relates to multiway valves, and more particularly to four-way valves of rotary plug type for establishing different combinations of connections between two primary fluid lines and two service lines.

Objects of the invention are to provide multiway valves adapted for use in various pneumatic or hydraulic control or distribution apparatus, and which are of simple, rugged and economical construction. Objects are to provide multiway valves of rotary plug type which have alternative end portions for connecting in different manners two primary lines or valve passages and two service lines or passages, and which break all communication between the several lines on adjustment of the valve to an intermediate position. A further object is to provide rotary plug multiway valves which offer only a relatively low resistance to angular adjustment when handling fluids under heavy pressure.

These and other objects and advantages of the invention will be apparent from the following specification when taken with the accompanying drawings in which:

Figs. 1 and 2 are a front elevation and a side elevation, respectively, of a multiway valve embodying the invention;

Figs. 3A and 4A are sections through the valve on planes indicated by section lines A—O—D and B—O—C of Fig. 1 respectively, as seen when the valve handle is in the radial plane AO;

Figs. 3B and 4B are sections through the valve on planes indicated by section lines A—O—C and B—O—D of Fig. 1 respectively, as seen when the valve handle is in the radial plane BO;

Fig. 5 is a somewhat schematic view illustrating one specific application or use of valves embodying the invention;

Fig. 6 is a somewhat schematic development of the illustrated valve as cut along a cylindrical surface passed through the axes of the primary and service passages of the valve body, the valve rotor being shown in position to break all communication between the several fluid passages;

Fig. 7 is a transverse section on plane 7—7 of Fig. 2, the valve rotor being shown in position to break all communication between the several fluid passages;

Figs. 8a to 8d are sections through the valve as taken on section lines a—a to d—d of Fig. 6;

Figs. 8a and 8b showing the valve rotor in one operative position, and Figs. 8c and 8d showing the valve rotor in its alternative position;

Fig. 9 is a side elevation of the valve rotor, and Figs. 10 to 12 are transverse sections through the valve rotor on section lines 10—10 to 12—12 respectively of Fig. 9.

In the drawings, the reference numeral 1 identifies a cylindrical valve body having a central cylindrical bore therethrough in which a cylindrical valve rotor 2 is seated for angular adjustment by means of a radially projecting handle 3. The end surfaces of the valve body are machined and ground to be normal to the axis of the cylindrical bore, the end of the handle 3 is threaded into the outer end 2a of the rotor 2, and the rotor is accurately positioned and retained within the valve body by a washer 4 and a nut 5 which is threaded upon the projecting inner end 2b of the rotor 2 to draw the handle 3 into engagement with the forward or outer end surface of the valve body. Stop pins 6 are threaded or are driven into bores at the outer end surface of the valve body to limit angular adjustment of the handle 3 to the alternative end positions of the rotor 2, the range of movement being 45° to opposite sides of the neutral or "valve closed" position which is shown in Figs. 1 and 2.

The valve body and rotor are constructed of materials appropriate for the nature and pressure of the fluid to be controlled or distributed. The illustrated embodiment of the invention may be employed for the distribution of a fluid under heavy pressure, specifically oil for actuating rams or pistons subject to heavy loads. The valve body and the rotor of the illustrated valve are of steel, the rotor 2 being case hardened and ground accurately to seat within the honed bore of the body 1 with a clearance of the order of 0.0002 to 0.0003 of an inch. The valve parts may be manufactured of brass, Monel metal or other alloys, and with greater dimensional latitude, when the fluid to be handled is under relatively low pressure.

The valves may be employed in various apparatus combinations to perform various functions but, for simplicity, the valve will be described as incorporated in a hydraulic system for delivering pressure fluid to either of two service lines, and to return the fluid in one service line to a sump when pressure fluid is delivered to the other line.

The valve body 1 is provided with two primary fluid passages 8 and 9 which extend parallel to the axis of the rotor 2 and are circumferentially spaced by 90° in the illustrated embodiment. These passages terminate in threaded openings at a surface of the valve body 1, and preferably at the inner end surface of the valve body, to receive pipe connections to associated equipment. For the assumed use of the valve, the outer end face of the valve body may be provided with legends "In" and "Ex" adjacent the passages 8 and 9 to indicate "Inlet" and "Exhaust" respectively. Either passage may be the inlet passage but, as shown in Fig. 1, the passage 8 is indicated as the inlet passage and the passage 9 as the exhaust passage.

Ports 8a, 8b and 9a, 9b extend radially from the passages 8 and 9 respectively and open into the central bore of the valve body 1, the ports 8a and 9a being in a plane transverse to the axis of the bore and adjacent the inner end of the valve, and the ports 8b and 9b being in a second plane transverse to the bore axis and located outwardly of the first or inner transverse plane. The several radial ports are formed by drilling from the outer surface of the valve body 1 to pass through the passages 8 and 9 and open into the valve body bore, and then closing the outer ends of these drillings by driving in tapered plugs 10.

The valve body is also provided with two service passages 11 and 12 which terminate at a surface of the valve body, and preferably at the outer end surface, in threaded openings for receiving pipe connections to points of use. Ports 11' and 12' extend radially inward from the passages 11 and 12 respectively to open into the bore of the valve body 1. These radial ports, like those previously described, are formed by drilling from the outer surface of the valve body, and then closing the outer ends of the drilled passages by driven plugs 10. Port 11' is in the inner transverse plane of the ports 8a and 9a, and port 12' is in an outer transverse plane spaced axially from the intermediate transverse plane of ports 8b and 9b. The several ports are of small diameter at their inner ends where they open into the central bore to control the lateral pressure of the hydraulic fluid on the valve rotor. With port openings having a diameter of the order of 5/64 inch, the rotor may be readily adjusted manually.

The valve rotor is provided with two passages for selectively establishing different connections between the primary fluid passages and the service passages at the respective end positions of the rotor. Each rotor passage is branched and, as viewed axially of the rotor, is of T-shape to connect valve body ports spaced by 180° at one end adjustment of the rotor, and to connect valve body ports spaced by 90° at the other end adjustment of the rotor.

As best shown in Figs. 10 and 12, the passage 13 includes a diametrically and a radially extending section which are both in the inner transverse plane of the valve body ports 8a, 9a and 11'. The second rotor passage comprises a section 14 formed by drilling axially of the rotor from the outer end 2a, radially extending branches 15 and 15' in the outer transverse plane of the valve body port 12', and a single radially extending branch 15'' in the intermediate transverse plane of the valve body ports 8b and 9b, the branches 15 and 15'' being in the same diametrical plane through the axis of the rotor. The outer end of the axial passage 14 is sealed by a tapered plug 16 which is driven into the outer end of the axial bore to clear the handle 3 or, as illustrated, the opening for the handle may be bored and threaded after the plug 16 is in place, gasket rings 17 of rubber or equivalent material are seated in circumferential recesses at the inner and outer ends of the rotor 2 to prevent leakage of the pressure fluid axially of the valve.

A typical application of the new valve is illustrated somewhat schematically in Fig. 5. The service passages 11, 12 of the valve are connected by pipes 18, 19 to the opposite ends of a cylinder 20 of a ram to control the supply and exhaust of pressure fluid to actuate a piston 21 in opposite directions. A pressure fluid from a container or sump 22, usually oil, is delivered to the valve body passage 8 through the pump 23 and pipe 24, and an exhaust line or return pipe 25 connects the valve body passage 9 to the sump.

The control action of the valve will be apparent from a consideration of Figs. 3A to 4B and Figs. 8a to 8d; Figs. 8a and 8b being transverse sections showing the effective fluid passages through the valve when handle 3 is in position A, Fig. 1, and the rotor 2 is in the position shown in Figs. 3A and 4A, and Figs. 8c and 8d being transverse sections showing the fluid passages through the valve when the handle is in position B and the rotor 2 is in the position shown in Figs. 3B and 4B. In Figs. 7 to 8d, the position of the handle 3 is indicated by the broken line 3'.

With the handle 3 in mid-position as shown in Figs. 1, 2, 6 and 7, the rotor passages are so positioned as to block all communication between the several valve body ports and no pressure fluid can flow to or from the ram of the Fig. 5 apparatus. On adjustment of the rotor handle 3 to position A, Fig. 1, the sections 15, 14 and 15'' of the rotor passage connect the valve passage 12, and thereby the line 19 from the ram, to the exhaust passage 9 of the valve and the return line 25 to the sump 22, see Figs. 3A and 8a. At the same time, the rotor passage 13 connects the inlet passage 8 of the valve body to the service passage 11 to deliver pressure fluid to the pipe line 18 which extends to the left end of the cylinder 20, see Figs. 4B and 8b.

On adjustment of the rotor handle to its alternative end position B, Fig. 1, the passage 13 connects the service passage 11, and thereby the pipe connection 18 from the left end of cylinder 20, to the exhaust passage 9 of the valve body, see Figs. 3B and 8c. At this adjustment of the rotor 2, the branches 15, 14 and 15'' of the second rotor passage connect the port 12' of the service passage 12 to the port 8b of the inlet passage 8 to supply pressure fluid to the pipe line 19 which extends to the right end of the cylinder 20, see Figs. 4B and 8d. The piston 21 of the ram may of course be held in any intermediate position of adjustment by turning the handle 3 of the valve to mid-position when the piston is in a desired intermediate position.

It will be apparent that other applications of the multiway valve are possible. In place of a single cylinder 20 and piston 21 which is power operated in opposite directions, the service lines 18, 19 may be connected to separate rams for the selective operation of devices which are returned to inactive positions by gravity or by springs. The valve may be employed to control the supply of either of two fluids to either of two points of use. In this case, a fluid supply line would be connected to the valve passage 9 as well as to the valve passage 8.

It is therefore to be understood that the terms "inlet," "exhaust," "inner" and "outer" are employed in the following claim only in a descriptive or relative sense and not as limitations to a particular use or mounting of the valve.

I claim:

A multiway valve comprising a valve body having a cylindrical rotor-receiving bore extending therethrough normal to inner and outer end surfaces which are parallel to each other; inlet and exhaust passages in said valve body, a pair of inlet ports and a pair of exhaust ports opening radially into said bore from the respective passages, the pairs of ports being in circumferentially spaced radial planes through the axis of said bore and the respective ports of each pair being located in inner and intermediate planes transverse to the axis of the bore, two circumferentially spaced service ports opening radially into said bore, and adapted to have connections made therefrom to service lines, one of said service ports being located in said inner transverse plane and the other service port being located in an outer transverse plane, a valve rotor seated in and angularly adjustable in said cylindrical bore said rotor extending beyond each end surface of said valve body and having a threaded inner end, a radially extending handle secured to the outwardly extending end of said rotor, and a nut threaded on the inner end of said rotor to draw said handle into engagement with the outer surface of said valve body; said rotor having a branched passage therethrough in said inner transverse plane constructed and arranged to connect the first service port to the inlet port at the inner transverse plane on adjustment of said rotor to a first position and to the associated exhaust port on adjustment of the rotor to a second position, and a second passage in said rotor for connecting said second service port to the exhaust port or to the inlet port of the intermediate transverse plane on adjustment of said rotor to said first or second position respectively, said second passage including an axial section connecting a radial section located in said intermediate transverse plane to branched sections in said outer transverse plane.

References Cited in the file of this patent

UNITED STATES PATENTS

| | | |
|---|---|---|
| 679,533 | Moore | July 30, 1901 |
| 920,268 | Caskey | May 4, 1909 |
| 978,256 | Wright | Dec. 13, 1910 |
| 1,806,845 | Dwyer | May 26, 1931 |
| 2,152,021 | Baumer | Mar. 28, 1939 |
| 2,234,322 | Sicard | Mar. 11, 1941 |
| 2,229,931 | Parker | Jan. 28, 1941 |
| 2,313,257 | Nelson | Mar. 9, 1943 |
| 2,391,505 | Parker | Dec. 25, 1945 |
| 2,576,300 | Kreiner | Nov. 27, 1951 |